United States Patent
Corden et al.

(10) Patent No.: US 10,189,172 B2
(45) Date of Patent: Jan. 29, 2019

(54) METHOD OF REUSING REMNANT PREPREG FRAMEWORK

(71) Applicant: CYTEC INDUSTRIAL MATERIALS (DERBY) LIMITED, Heanor (GB)

(72) Inventors: Thomas Corden, Nottingham (GB); Ross A. Key, Notthingham (GB)

(*) Notice: Subject to any disclaimer, the term of this patent is extended or adjusted under 35 U.S.C. 154(b) by 0 days.

(21) Appl. No.: 15/751,287

(22) PCT Filed: Aug. 12, 2016

(86) PCT No.: PCT/EP2016/069196
§ 371 (c)(1),
(2) Date: Feb. 8, 2018

(87) PCT Pub. No.: WO2017/029205
PCT Pub. Date: Feb. 23, 2017

(65) Prior Publication Data
US 2018/0229393 A1    Aug. 16, 2018

Related U.S. Application Data

(60) Provisional application No. 62/205,025, filed on Aug. 14, 2015.

(51) Int. Cl.
*B26F 1/38*    (2006.01)
*B29B 17/00*   (2006.01)
(Continued)

(52) U.S. Cl.
CPC .............. *B26F 1/38* (2013.01); *B26D 5/00* (2013.01); *B29B 17/00* (2013.01);
(Continued)

(58) Field of Classification Search
CPC ... B29B 17/0042; B29C 47/0021; B26F 1/38; B26D 5/00
See application file for complete search history.

(56) References Cited

U.S. PATENT DOCUMENTS

| | | | |
|---|---|---|---|
| 8,298,359 B2* | 10/2012 | Inserra Imparato | ........................ B29B 17/0042 156/263 |
| 2010/0154608 A1* | 6/2010 | Charines | .................. B26D 7/18 83/23 |
| 2010/0267868 A1* | 10/2010 | Takahashi | ................. B29B 9/14 524/79 |

FOREIGN PATENT DOCUMENTS

| | | |
|---|---|---|
| EP | 2233517 A1 | 9/2010 |
| JP | 2015077790 A | 4/2015 |

OTHER PUBLICATIONS

Gaurav Nilakantan et al: "Reuse and upcycling of aerospace prepreg scrap and waste", Reinforced Plastics., vol. 59, No. 1, Jan. 1, 2015, pp. 44-51.

* cited by examiner

*Primary Examiner* — Matthew J Daniels
*Assistant Examiner* — Hana C Page
(74) *Attorney, Agent, or Firm* — Thi Dang

(57) ABSTRACT

The present invention provides a method of reusing prepreg material. The method comprises providing a remnant prepreg, defining a pattern of cutting the remnant prepreg framework to form a continuous strip of the remnant prepreg framework, and cutting the remnant prepreg framework to form a continuous strip of the remnant prepreg framework. The remnant prepreg framework continuous strip may be extruded into a short fiber molding compound (SMC). The SMC may then be used to make parts with lower structural requirements than the parts cut out of the prepreg broadgood. Such SMC parts may be used in industries such as aerospace; automotive; other transportation such as trucks, buses, and motorcycles; sporting goods; and wind.

11 Claims, 5 Drawing Sheets

(51) Int. Cl.
    *B26D 5/00*           (2006.01)
    *B29B 17/02*         (2006.01)
    *B29C 47/00*         (2006.01)
    *C08J 11/06*         (2006.01)
    B29K 105/06       (2006.01)
    B29K 307/04       (2006.01)
    B29K 105/08       (2006.01)
    B29K 105/24       (2006.01)
    B26F 3/00           (2006.01)
    B29K 63/00        (2006.01)
    B29K 105/12       (2006.01)
    B29K 105/26       (2006.01)

(52) U.S. Cl.
    CPC .......... *B29B 17/0026* (2013.01); *B29B 17/02* (2013.01); *B29C 47/0004* (2013.01); *B29C 47/0021* (2013.01); *C08J 11/06* (2013.01); B26D 2005/002 (2013.01); B26D 2210/00 (2013.01); B26F 3/004 (2013.01); B29B 17/0042 (2013.01); B29B 2017/0217 (2013.01); B29K 2063/00 (2013.01); B29K 2105/06 (2013.01); B29K 2105/0872 (2013.01); B29K 2105/12 (2013.01); B29K 2105/246 (2013.01); B29K 2105/26 (2013.01); B29K 2307/04 (2013.01); C08J 2363/00 (2013.01); Y02W 30/62 (2015.05)

ized application to the fibers in uncured prepreg material is hazardous.

METHOD OF REUSING REMNANT PREPREG FRAMEWORK

CROSS-REFERENCE TO RELATED APPLICATIONS

The present application is a U.S. national phase entry under 35 U.S.C. § 371 of International Application No. PCT/EP2016/069196, filed on 12 Aug. 2016, which claims priority to U.S. provisional Application No. 62/205,025, filed on 14 Aug. 2015, the entire content of each of these applications is explicitly incorporated herein by reference.

BACKGROUND

The present disclosure relates generally to a method of reusing material used in the manufacture of composite parts and, more particularly, to a method of reusing uncured prepreg scrap or remnant prepreg framework.

The composite market continues to grow as manufacturers in industries such as aerospace, automobile, sporting, and wind continue to seek ways of manufacturing parts that are stronger than traditional metallurgical parts, yet lighter in weight, thereby resulting in a reduction of $CO_2$ emissions. In addition to their strength and weight benefits, composite materials also have the benefits of increased corrosion resistance, improved fire resistance, easier design because of functional integration, and the possibility of complex shapes. Because of these benefits of composite materials, their use will only increase.

Unfortunately, present composite manufacturing techniques generate a substantial amount of scrap or remnant uncured prepreg material from a sheet of prepreg material from which prepreg parts are cut. A sheet of prepreg material is known in the industry as prepreg broadgoods. The amount of scrap from prepreg broadgoods can be as much as 35%. This scrap is currently estimated to be produced in the amount of millions of pounds annually, and, especially if it is considered to be a hazardous waste, can be costly for manufacturers to dispose of Uncured epoxy resin is the hazardous component of the waste prepreg. Direct exposure to uncured epoxy resin can cause sensitization by skin contact and irritation to eyes and skin. Furthermore, epoxy-based materials are toxic to aquatic organisms and many cause long-term adverse effects in the aquatic environment. Waste disposal fees, typically $0.75 to $3 per pound of scrap, and exponentially higher if the waste is considered hazardous, represent a loss of revenue as the fiber and uncured resin in the scrap are still usable. Virgin carbon fiber prepreg material typically costs around $45 per pound. Upcycling of scrap prepreg can help companies recover some of their material and manufacturing costs as well as be environmentally friendly.

For the present disclosure, the term "reuse" refers to virgin or uncured prepreg or composite material, whereas "recycle" refers to cured prepreg or composite materials. Different techniques and applications have been developed for recycling prepreg material. The composite can be ground, sheared, chipped or flaked into suitable sizes for use as filler material in new molded composite parts.

Likewise, various methods and applications have been developed for reusing prepreg material. For example, one technique involves reducing the random shapes and cut-outs of scrap prepreg into rectangular chip form. This cut prepreg scrap can be directly used to manufacture parts through closed compression molding, or it can be further processed into a sheet form through the application of heat and pressure and be made available as rolls. See W. Michaeli et al., "New Technologies for Processing of Non-Cured Prepreg Waste—Preparation of High Strength DMC", 41$^{st}$ International SAMPE Symposium, Mar. 24-28, 1996.

Still, virgin prepreg is commonly supplied with an interleaf (or a releasable backing sheet) on one or both sides of the prepreg. Uncured prepreg is typically tacky to the touch and without the interleaf backing the uncured prepreg material, would stick together when rolled up for shipping. This interleaf, which can be in the form of, for example, a polyethylene or paper sheet, needs to be removed in order for the uncured prepreg scrap to be reused. This is typically done by hand. Therefore, there remains a need for a less laborious process of preparing prepreg material for reuse.

Recycling cured prepregs is difficult due to both the reinforcing fiber and the resin. As a result, recycling is limited to down recycling. Y. Yang et al., "Recycling of Composite Materials", Chem. Eng. Process (2011).

SUMMARY

The present disclosure provides a method of reusing prepreg material. The method includes defining a pattern for cutting the remnant prepreg material to form a continuous strip of the remnant prepreg material, and cutting the remnant prepreg material to form a continuous strip of the remnant prepreg material.

DETAILED DESCRIPTION

Figure 1:
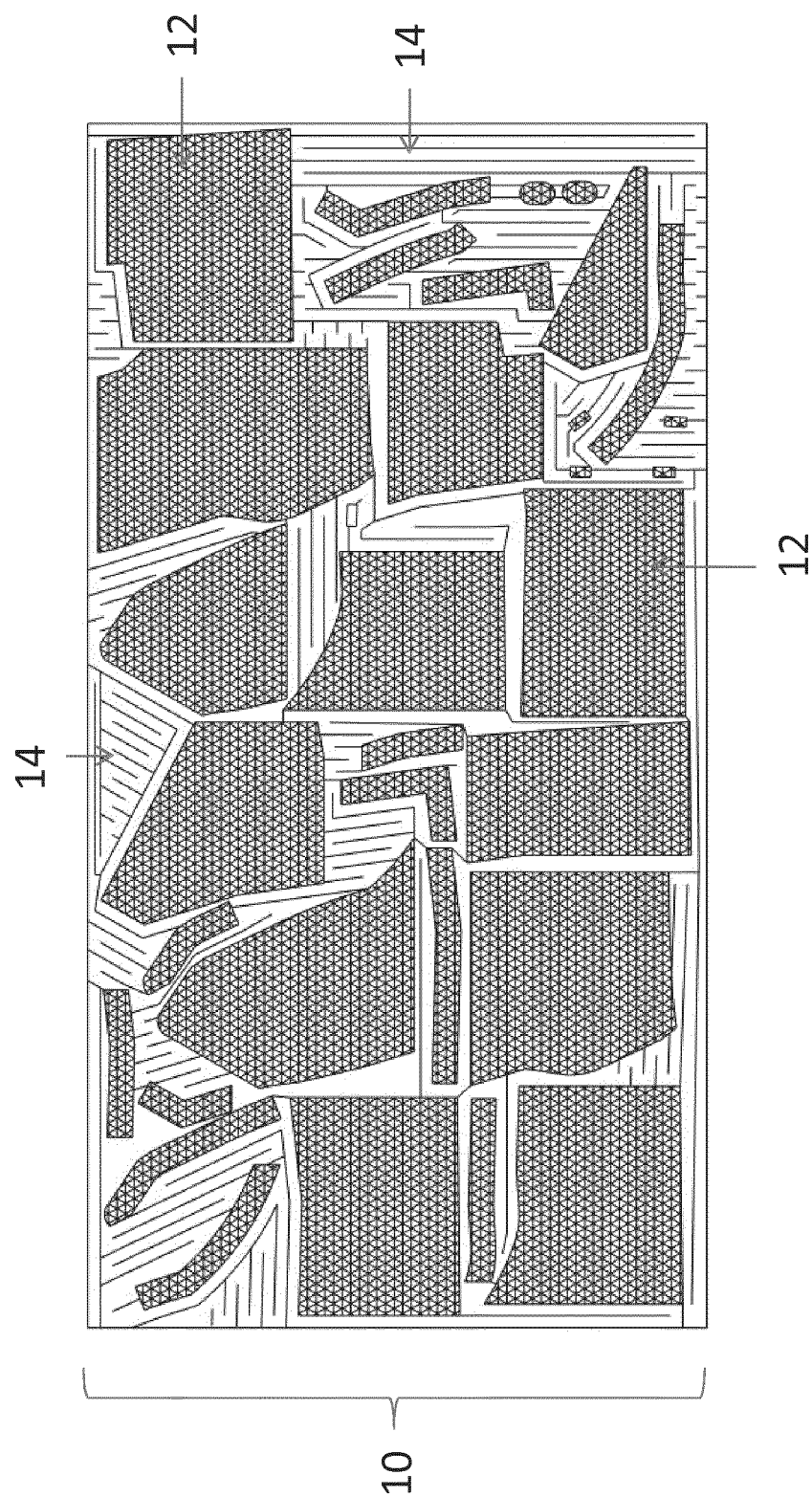
FIG. 1 illustrates an example of a remnant prepreg framework for carrying out the method of the present disclosure.

The term "prepreg" as used herein means a dry fiber material in woven and/or unidirectional format, pre-impregnated with a resin in order to produce an uncured fiber reinforced plastic.

The term "remnant prepreg framework" as used herein means the prepreg material remaining after cutting and removal of specific ply geometries for making a given component or composite structure.

The term "continuous strip" means that the remnant prepreg framework is in strip form with a high length to width ratio. In some embodiments, the continuous strip has a width of about 10 mm to about 40 mm.

Prepreg Fibers: Examples of useful prepreg include reinforcing fibers impregnated with a resin matrix. The fabric, in woven or unidirectional format, is manufactured from fiber tows using a weaving machine or loom. A unidirectional fabric has the majority of the reinforcing fibers running in one direction only. Usually the majority of fibers are in the 0 degree direction on the roll or warp direction. A small amount of fiber may run in other directions in order to hold the majority of fibers in position.

The reinforcing fibers include carbon, glass, aramid, ceramic, or other suitable materials. The reinforcing fiber may be made of a blend of at least two of the preceding materials. The reinforcing fiber may also be a combination of two fibers made of different materials. The reinforcing fiber may be continuous, discontinuous, unidirectional, twisted, and/or intertwined.

The fibers in a reinforcing fiber layer are preferably in the form of continuous fibres, filaments, tows, bundles, sheets, plies, or combinations thereof. The precise specification of the fibers, for instance their orientation and/or density can be specified to achieve the optimum performance for the intended use of the prepregs. Continuous fibers may adopt any of unidirectional (aligned in one direction), multi-directional (aligned in different directions), non-woven, woven, knitted, stitched, wound, and braided configurations. Woven fibre structures may comprise a plurality of woven tows, each tow composed of a plurality of filaments, e.g. thousands of filaments. In further embodiments, the tows may be held in position by cross-tow stitches, weft-insertion knitting stitches, or a small amount of resin binder, such as a thermoplastic resin. In one preferred embodiment, the layer(s) of reinforcing fibres used in the present invention comprise woven fibre structures comprising a plurality of woven tows arranged substantially orthogonally. In a further preferred embodiment, the layer(s) of reinforcing fibres used in the present invention comprise fibre structures wherein the fibres are arranged unidirectionally. In a further preferred embodiment, the layer(s) of reinforcing fibres used in the present invention comprise fibre structures wherein the fibres are arranged in other orientations, such as tri-axial wherein fibres are arranged in three directions, such as 0°, +60°, −60.

The reinforcing fibers are preferably selected from, but not limited to, fibers of glass (including Electrical or E-glass), carbon (particularly graphite), aramid, polyamide, high-modulus polyethylene (PE), polyester, poly-p-phenylene-benzoxazole (PBO), boron, quartz, basalt, ceramic, and combinations thereof. Carbon fiber is particularly suitable. For the fabrication of high-strength composite materials, e.g. for aerospace and automotive applications, it is preferred that the reinforcing fibres have a tensile strength of greater than 3500 MPa.

Prepreg Resin: The curable resin matrix may contain one or more resins selected from thermosetting and/or thermoplastic resins conventionally known in the art. The formulation of the curable resin matrix can be specified to achieve the optimum performance for the intended use of the prepregs. The resinous material may comprise thermoset resin such as at least one of bismaleamide ("BMI"), cyanate ester, epoxy, polybenzoxazine, phenolic resin, or vinyl ester. Preferable resins are thermoset resins and more preferable resins are epoxy resins. Suitable curable resins may be selected from the group consisting of an epoxy resin, an addition-polymerisation resin (for instance a bis-maleimide resin), a benzoxazine resin, a formaldehyde condensate resin (especially a formaldehyde-phenol or urea-formaldehyde resin), a vinyl ester resin, resins of, 1,3,5-triazine-2,4,6-triamine (melamine), a cyanate resin, an isocyanate resin, a phenolic resin and mixtures of two or more thereof. Preferably the curable resins are selected from epoxy, phenolic, or cyanate ester resins, particularly epoxy and phenolic resins, and particularly epoxy resins. An epoxy resin is preferably an epoxy resin derived from the mono or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof. Examples of addition-polymerisation resins are acrylics, vinyls, bis-maleimides, and unsaturated polyesters Examples of formaldehyde condensate resins are urea, melamine, and phenols.

The particularly preferred epoxy resins may be mono functional, difunctional, or multifunctional epoxy resins. As used herein, the term "multifunctional" epoxy resin is a resin which has a functionality of greater than two. Preferred multifunctional resins are at least trifunctional, typically trifunctional or tetrafunctional, although epoxy resins having greater functionality may also be used, for instance those having 5 or 6 epoxy groups. The term "multi-functional" encompasses resins which have non-integer functionality, for instance epoxy phenol novolac (EPN) resins, as known in the art. The epoxy resin may comprise monofunctional, difunctional, and/or multifunctional (typically trifunctional or tetrafunctional) epoxy resins. Preferably the curable resin comprises one or more difunctional epoxy resin(s) (and preferably at least two difunctional epoxy resin(s)) optionally in combination with one or more multifunctional (typically trifunctional or tetrafunctional) epoxy resin(s). In a preferred embodiment, the curable resin comprises one or more difunctional epoxy resin(s) (and preferably at least two difunctional epoxy resin(s)) optionally in combination with one or more trifunctional epoxy resin(s) and/or one or more tetrafunctional epoxy resin(s). In a further preferred embodiment, the curable resin comprises one or more multifunctional epoxy resin(s) (typically trifunctional and/or tetrafunctional).

Suitable difunctional epoxy resins include those based on: diglycidyl ether of Bisphenol F, Bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof. Difunctional epoxy resins are preferably selected from diglycidyl ether of Bisphenol F (DGEBF), diglycidyl ether of Bisphenol A (DGEBA), diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, brominated resins, triglycidyl aminophenols, aromatic glycidyl amines, heterocyclic glycidyl imidines and amides, glycidyl ethers, fluorinated epoxy resins, or any combination thereof.

Suitable tetrafunctional epoxy resins include N,N,N',N'-tetraglycidyl diamino diphenylmethane (TGDDM) and N,N, N',N'-tetraglycidyl-m-xylenediamine.

Thus, an epoxy resin may be selected from N,N,N',N'-tetraglycidyl diamino diphenylmethane (e.g. grades MY 9663, MY 720 or MY 721; Huntsman); N,N,N',N'-tetraglycidyl-bis(4-aminophenyl)-1,4-diisopropylbenzene (e.g. EPON 1071; Shell Chemical Co.); N,N,N',N'-tetraglycidyl-bis(4-amino-3,5-dimethylphenyl)-1,4-diisopropylbenzene, (e.g. EPON 1072; Shell Chemical Co.); triglycidyl ethers of p-aminophenol (e.g. MY 0510; Ciba-Geigy); diglycidyl ethers of bisphenol A based materials such as 2,2-bis(4,4'-dihydroxy phenyl) propane (e.g. DE R 661 (Dow), or Epikote 828 (Shell)) and higher molecular weight diglycidyl ethers of bisphenol A based materials such as those with an epoxy equivalent weight of 400-3500 g/mol (e.g. Epikote 1001 and Epikote 1009), and Novolak resins preferably of viscosity 8-20 Pa s at 25° C.; glycidyl ethers of phenol Novolak resins (e.g. DEN 431 or DEN 438; Dow); diglycidyl 1,2-phthalate (e.g. GLY CEL A-100); diglycidyl derivative of dihydroxy diphenyl methane (Bisphenol F) (e.g. PY 306; Ciba Geigy). Other epoxy resin precursors include cycloaliphatics such as 3',4'-epoxycyclohexyl-3,4-epoxycyclohexane carboxylate (e.g. CY 179; Ciba Geigy) and those in the "Bakelite" range of Union Carbide Corporation.

The resinous material may also comprise thermoplastic resin including polymers and co-polymers such as at least one of polyolefins including polymethylene, polyoxymethylene, polyethylene, polypropylene, high density polyethylene, and low density polyethylene; polystyrene; acrylonitrylstyrene; acrylonitrile-butylacrylate-styrene polymers; butadiene; polyvinyl chloride; acrylics; polyarylene ethers; polysulfones including polyethersulphone, polyphenyl sulfone, and polysulfone; polyphenylene sulfide; polyetherimide, polyetheretherketone, polyaryletherketone, polyphenylene sulphide, polysiloxane; polyimides; liquid crystal polymer; polycarbonate, polyphenylene oxide; styrene maleic anhydride; polyamides including polyamide-imide, polycaprolactam, polyphthalamide, nylon 12, nylon 66, nylon 6/6, nylon 6/6/t, nylon 4/6, and nylon 10/10; polyesters including polyethylene terephthalate, polybutylene terephthalate, and polycyclohexylene-dimethylene terephthalate; styrene maleic anhydride; polyacrylonitrile; polyoxymethylene (polyacetal); or various types of rubbers or elastomers including thermoplastic elastomers, polyisoprene, polybutadiene, polyisobutylene, polychloroprene, butadiene-styrene, butadiene-acrylonitirile or silicones, polymethymethacrylate; and blends of the preceding with each other.

The resin matrix is batch mixed at temperature, depending on the properties of the raw material constituents, including: base resin, catalyst, hardener, and other ingredients. The resin is then applied to the fabric inline under temperature and pressure resulting in partial impregnation of the fabric or offline through single or dual resin film additions.

The thickness of a typical prepreg is from about 0.1 to about 0.6 mm ply thickness for a 100 to 600 grams square meter fabrics. Many woven or multi axial prepregs are about one (1) meter to about 1.5 meters wide. Unidirectional (UD) prepreg typically is about 0.3 meter to about 1.5 meters wide. The prepreg comes on rolls with up to 100 linear meters thereon.

The step of defining a cutting pattern involves the following considerations. The cut should be made parallel to the fiber direction in order to maximize the strength of the continuous strip geometry for re-winding. In addition, the continuous strip cutting pattern is heavily dependent on the prepreg sheet geometry, the geometry of the parts being removed from the sheet and thus leaving holes, and the resultant geometry of the remnant prepreg framework. The cutting path options may be limited in order to maximize continuous strip length through nesting. The resulting continuous strip is a single long piece of known width that can be easily spooled up and handled in subsequent processing. In addition, the continuous strip makes removal of the poly or paper interleaf easier and allows it to be reused without further conveying, shredding, or handling equipment.

FIG. 1 illustrates a prepreg broadgoods 10 where parts have been cut out leaving holes 12 in the prepreg broadgoods 10. The cut out parts are typically used as structural components in industries such as aerospace; automotive; other transportation such as trucks, buses, and motorcycles; wind; and sporting goods. After all of the parts have been cut out of the prepreg broadgoods 10, the remnant prepreg framework 14 is the starting material for practicing the present process and present process will cut the remnant prepreg framework 14 into a continuous strip.

Figure 2:
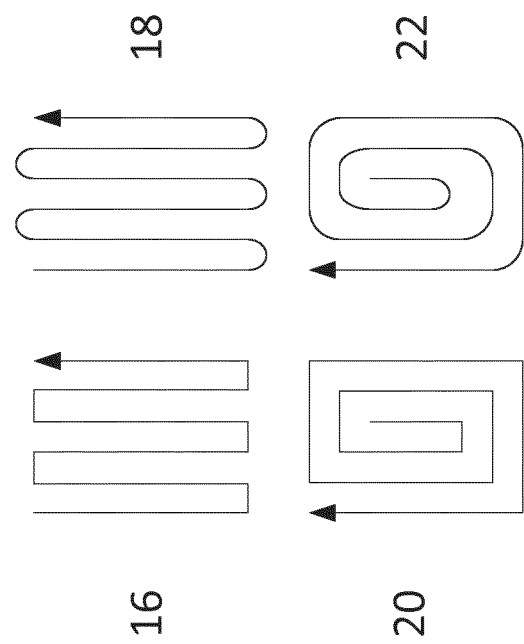
FIG. 2 illustrates possible cutting patterns for cutting a remnant prepreg framework.

FIG. 2 illustrates possible cutting patterns for the remnant prepreg framework 14 of the prepreg broadgoods 10. Cutting pattern 16 is a linear pattern. Cutting pattern 18 is linear with radii pattern. Cutting pattern 20 is a linear spiral pattern. Cutting pattern 22 is a spiral pattern. Fabric type and format will limit the cutting patterns that can be used. For woven materials, the cut pattern can be optimised based on the geometry of remnant prepreg framework 14, limiting take time during the cutting phase. UD prepregs however, should be cut parallel to the fibre direction or cross-plied (at least 2 layers at 0/90° orientations or +/−45°) prior to continuous strip cutting, in order to maximize the transverse strength of the continuous strip geometry for re-winding. To maximize the continuous strip length, multiple cutting strategies may be required for a prepreg broadgoods 10.

Useful equipment for cutting the remnant prepreg framework 14 includes a standard static drag knife, or ultrasonic knife affixed to a three-axis flatbed cutting machine. Useful alternatives include water jets, laser, and stamping.

Figure 3:
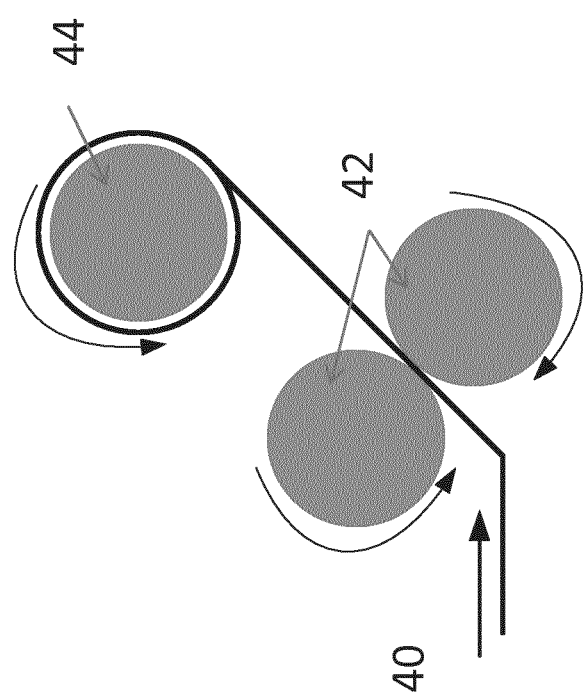
FIG. 3 illustrates the processing of an off-winding a continuous strip made from the present process.

FIG. 3 shows a resulting continuous strip cut from a remnant prepreg framework being fed in the direction of arrow 40 to nip roll(s) 42 to achieve the tension required for re-winding. Re-winding of the continuous strip takes place on bobbin 44.

Figure 4:
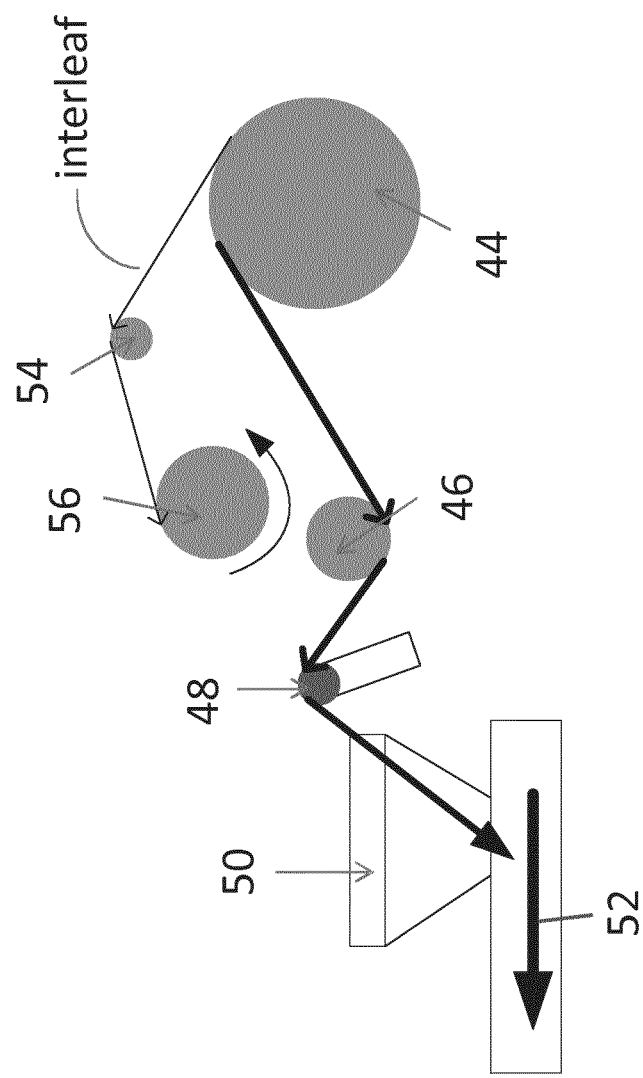
FIG. 4 illustrates removal of an interleaf from the continuous strip.

FIG. 4 shows automated feeding of the wound continuous strip from bobbin 44 including tensioning roller 46 over another roller 48 into an extruder 50. Tensioning roller 46 provides tension opposing the feed direction and acts to align and stabilize the continuous strip prior to entering the extruder 50. In addition, the interleaf may be removed by using a vacuum cleaner or driven interleaf off-wind tensioner roll 54 and driven off-wind roll with torque coupling 56. The extruder mixing produces a short fiber molding compound represented by the arrow 52.

This short fibre molding compound (hereinafter "SMC") may be used either on its own, or in combination with the larger pieces of prepreg. Typically it would be used for parts with lower structural requirements than the parts which the main pieces of the prepreg sheets are used for. It can be included with the main pieces to make bosses, reinforcing ribs, or edge details that may be too complex in geometry to form with the main continuous fibre pieces. The SMC may be used for the rapid forming of complex non- and semi-structural components for example such as inserts, and/or brackets, or to provide reinforcement to stiffening ribs and/or bosses. If mixing paddle elements are introduced to the feed screw, the fibre length may be reduced to allow the resultant extrudate to be used as a high performance adhesive filler. The SMC parts may be used in industries such as aerospace; automotive; other transportation such as trucks, buses, and motorcycles; wind; and sporting goods.

The SMC may also be used as a core layer, between two outer skins of continuous fibre prepreg, to create extra thickness in a similar manner to using a syntactic resin core, or a foam core. The SMC can be used on its own to make parts with lower structural property requirements than would be achieved with the main pieces with continuous fibre. The SMC has shorter, non-continuous fibres, and as a result, the mechanical properties are limited, but it has the advantage that it can be formed to more complex shapes than the conventional prepreg.

Figure 5:
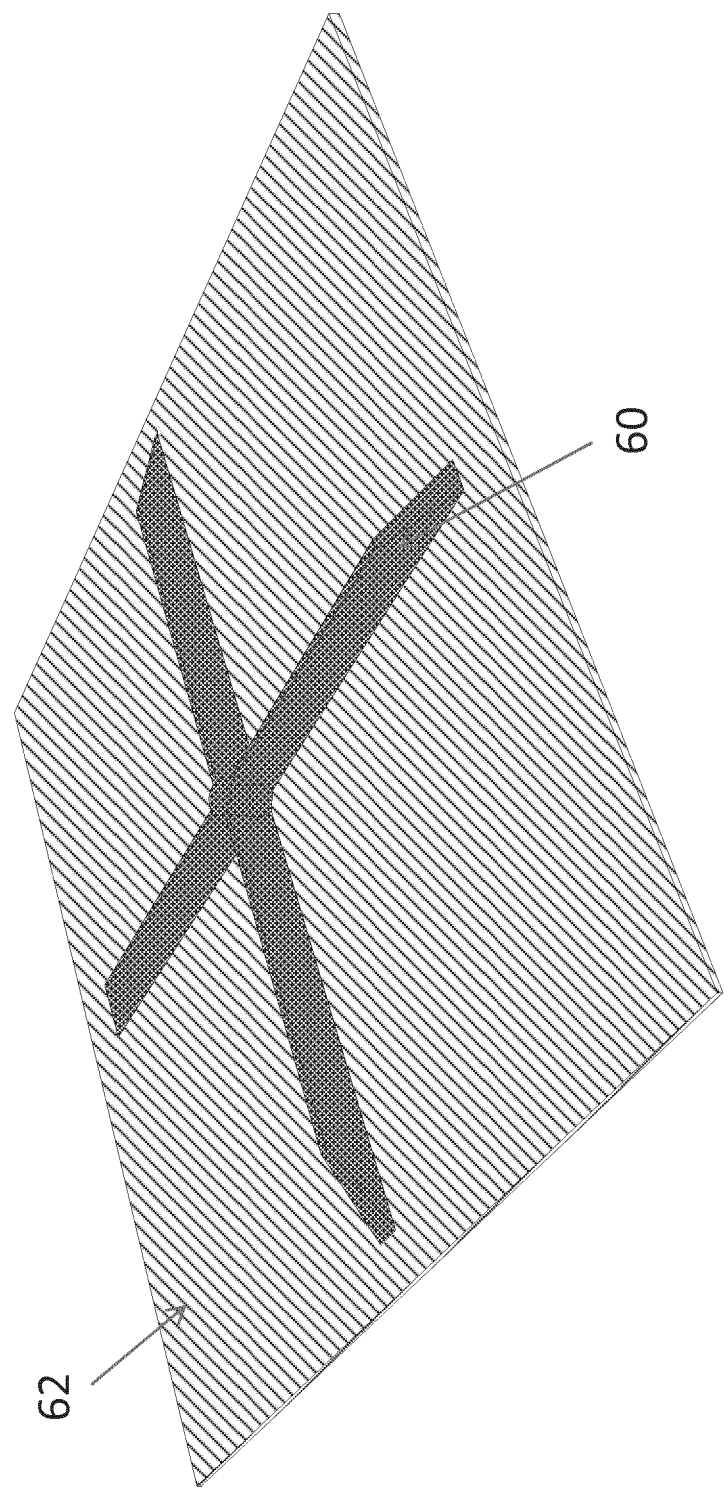
FIG. 5 illustrates a cured composite structure with reinforcing ribs made from the short fiber molding compound resulting from extruding the continuous strip of the present invention.

FIG. 5 shows a flat laminate of continuous cured prepreg 62 with reinforcing ribs of SMC 60 made from extruding the continuous strip of the present invention.

The advantages of the disclosed method over known processes follow. Typically, when manufacturing components from composite broadgoods, 35% waste can be expected due to pre-impregnation and poor profile nesting. Alternative recycling or fibre separation processes, utilizing solvent extraction or extreme heat (>400° C.), such as solvolysis and pyrolysis respectively, reclaim the carbon fiber at detriment to virgin fiber mechanical properties, for 100 percent resin loss. This method provides the end user with a method to achieve 100 percent material utilization for multiple materials, providing a low cost short-fibre moulding compound. The material has been shown to exhibit improved flow characteristics when compared with traditional continuous fibre materials for the rapid forming of complex non- and semi-structural components.

Should the disclosure of any patents, patent applications, and publications which are incorporated herein by reference conflict with the description of the present application to the extent that it may render a term unclear, the present description shall take precedence.

Disclosed herewith is an exemplary method of reusing remnant or scrap pieces of prepreg material.

Example 1

With reference to FIG. 1, a prepreg broadgood 10 comprised multiple layers of 220 gsm multi-directional cross-plied UD carbon fiber with epoxy. Parts were cut out of the prepreg broadgoods 10 to leave holes 12 creating the remnant prepreg framework 14. The thickness of the remnant prepreg framework 14 was 1 mm. The prepreg broadgoods waste amounted to approximately 35 percent. A linear cutting pattern 16 was utilized for cutting of the remnant prepreg framework 14 to give a continuous strip of approximately 55 meters in length with a width of 20 mm. The remnant prepreg framework continuous strip was fed into an extruder to make SMC. As a result, this invention converted the 35% prepreg broadgoods waste into a reusable material.

While the present disclosure reveals certain preferred embodiments, it will be understood by those skilled in the art that various changes may be made and equivalents may be substituted for elements thereof without departing from the scope of the invention. Further, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of reusing prepreg material comprising:
providing a broad prepreg material comprised of reinforcing fibers impregnated with a resin matrix;
cutting out one or more geometric shapes from the broad prepreg material to make a component, leaving behind at least one piece of remnant prepreg material;
defining a pattern for cutting said piece of remnant prepreg material to form a single continuous strip of said remnant prepreg material; and
cutting the piece of remnant prepreg material to form the single continuous strip thereof.

2. The method of claim 1, wherein the broad prepreg material comprises a releasable backing sheet on at least one side.

3. The method of claim 2 wherein the resin matrix comprises a thermoset resin.

4. The method of claim 2, wherein the resin matrix comprises a thermoplastic resin.

5. The method of claim 3, wherein the thermoset resin is an epoxy resin.

6. The method according to claim 1, wherein the reinforcing fibers in the broad prepreg materials are carbon fibers.

7. The method according to claim 1, wherein the reinforcing fibers in the broad prepreg material are unidirectional fibers.

8. The method according to claim 1, further comprising winding the continuous strip onto a bobbin.

9. The method according to claim 1, further comprising feeding the continuous strip of remnant prepreg material into an extruder.

10. The method of claim 2 further comprising removing the releasable backing sheet from the continuous strip of remnant prepreg material and winding the continuous strip on a bobbin.

11. The method of claim 8 wherein the extruded continuous strip is used to make a molded structure.

\* \* \* \* \*